United States Patent [19]

Funk

[11] 4,445,727
[45] May 1, 1984

[54] METHOD OF ATTACHING A WEAR STRIP TO DOWNHOLE MEMBERS

[75] Inventor: Charles F. Funk, Gulfport, Miss.

[73] Assignee: Metal Parts, Inc., Gulfport, Miss.

[21] Appl. No.: 332,105

[22] Filed: Dec. 18, 1981

[51] Int. Cl.³ .................. E21B 17/10; F10C 43/02
[52] U.S. Cl. .................. 308/4 A; 29/149.5 S; 29/149.5 R; 175/325
[58] Field of Search .......... 308/4 R, 4 A; 384/276, 384/280, 295; 29/149.5 S, 149.5 R, 149.5 C; 175/325; 285/45, 286

[56] References Cited

U.S. PATENT DOCUMENTS

| 2,301,495 | 11/1942 | Abegg | 285/286 X |
| 2,388,416 | 11/1945 | Johnson | 308/4 A X |
| 2,877,062 | 3/1959 | Hall | 175/325 X |
| 3,507,525 | 4/1970 | Sable | 308/4 A X |
| 4,296,973 | 10/1981 | Hartwell | 308/4 A |

Primary Examiner—Stuart S. Levy
Assistant Examiner—Thomas R. Hannon
Attorney, Agent, or Firm—Vaden, Eickenroht, Thompson, Bednar & Jamison

[57] ABSTRACT

A method of encircling the outside surface of a downhole tool joint with wear strips of cast, relatively brittle, drillable material in which the strips have notches in their abutting ends, and weld metal is puddled in openings formed by the notches. The weld metal is fused to the tool joint surface but not to the wear strips.

1 Claim, 10 Drawing Figures

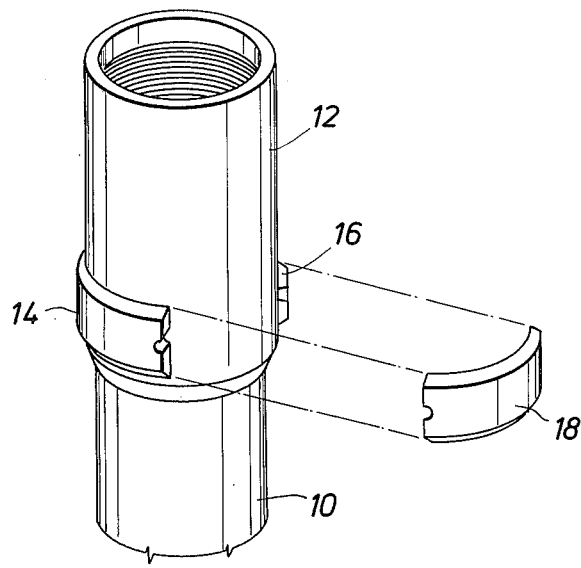
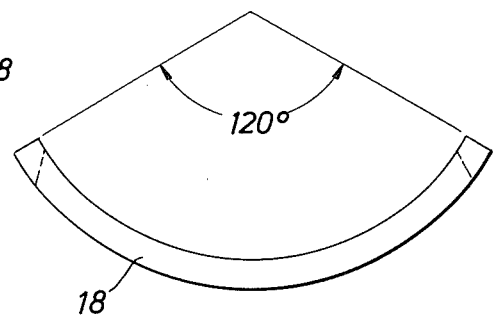
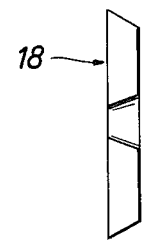
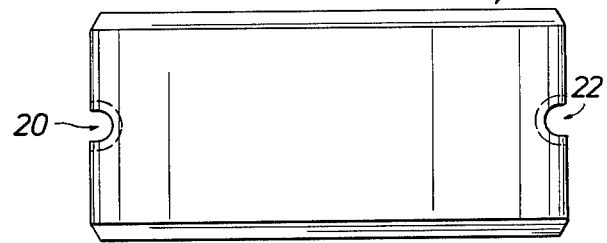
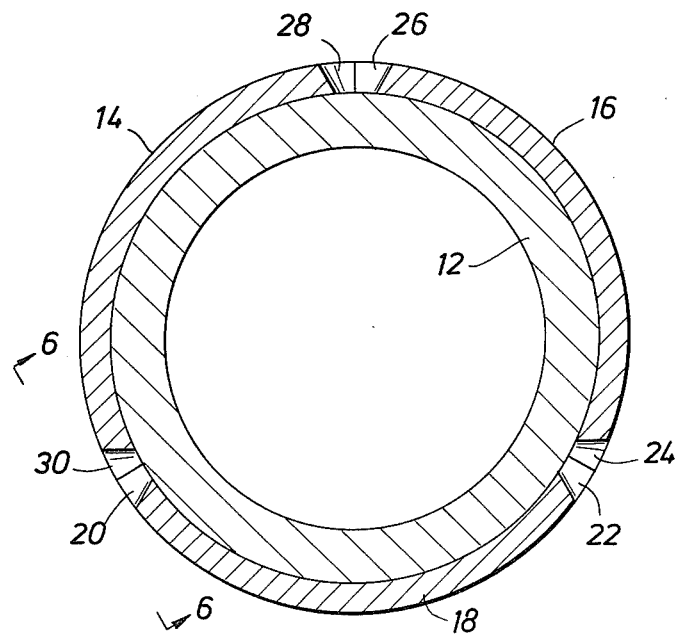

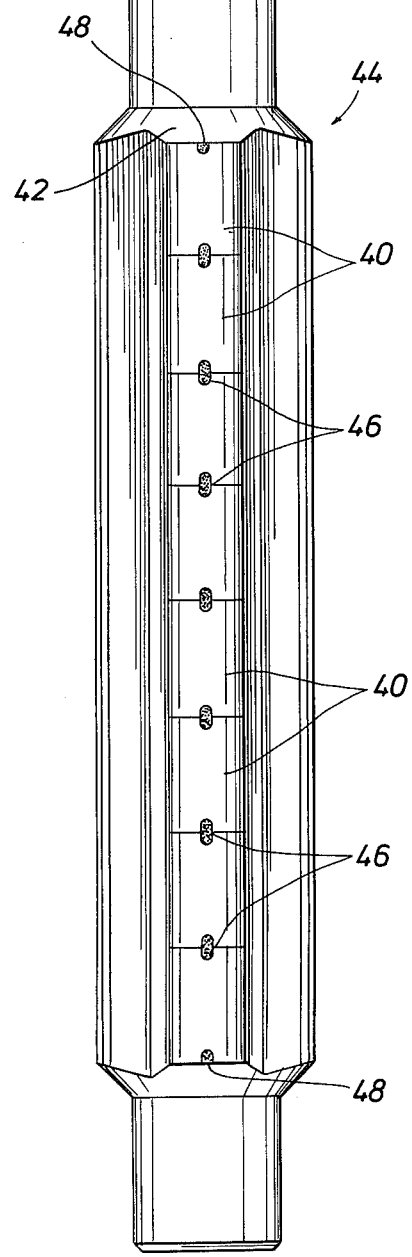
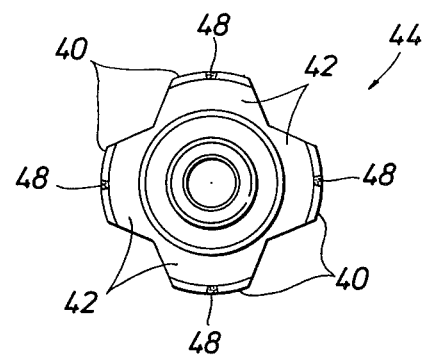
FIG. 9
FIG. 10

METHOD OF ATTACHING A WEAR STRIP TO DOWNHOLE MEMBERS

This invention relates to wear strips for protecting downhole members, such as tool joints and stabilizers, from the abrasive action of the well casing and the well bore as the members are rotated therein and to a method for attaching the wear strips to the downhole member.

It is a common practice to cover the lower portion of the box of a tool joint with a wear resistant material, such as tungsten carbide. This is referred to as "hard banding". Tungsten carbide, or some other such hard, wear resistant material, is also used to cover the outer surface of the blades of downhole stabilizers. This is done to increase the life of the tool joints and the stabilizers by increasing their resistance to wear as they are rotated in a well bore in contact with either the casing in the well bore or the wall of the well bore itself.

The tungsten carbide particles and the other similar material used for hard banding are applied to the surface to be protected in two ways. In one, the metal adjacent the surface to be protected is heated sufficiently to melt, the carbide particles are added to the molten metal, and are bonded to the surface when the metal solidifies. Thus, the matrix holding the particles of tungsten carbide is provided by the metal of the surface to be protected. In the other method, the matrix is supplied by the welding electrode, which during the welding operation becomes molten. Some of the metal adjacent the surface to be protected also melts to fuse the metal supplied by the electrode to the surface.

This type of hard banding is applied completely around the lower end of the box of the tool joint for a distance of about 3" (76.2 mm). It varies in thickness from 1/16" (1.59 mm) to ⅛" (3.20 mm). Usually, grooves are cut in the tool joint so the hard metal will be flush with the O.D. of the tool joint. It can be applied, however, directly to the O.D. without grooving.

With the two methods of hard banding tool joints described above, the surface of the box for a distance of about 3" must be raised to fusion temperatures to bond the hard metal to the tool joint. This is detrimental to the strength of the joint. This same detrimental effect occurs with stabilizers where the hard banding material is applied to the entire length of each blade.

It is an object of this invention to provide wear strips for downhole tools and a method of attaching them to the surface to be protected that requires only a few spaced, relatively small, areas of the surface to be protected to be heated to fusion temperature.

It is another object of this invention to provide wear strips of hard, drillable, cast material that are held in place on the surface to be protected by weld metal that is fused to a small area of the surface to be protected and fills an opening formed in aligned slots in the abutting ends of adjacent wear strips.

As stated above, most hard banding of tool joints consists of the application of tungsten carbide particles or the like that are held in position by a matrix of metal produced by the welding rod or the tool joint. Tungsten carbide particles are very hard and resist abrasion, but they also will cut the surfaces they engage. Therefore, in an inclined hole, where the drill string will tend to lay against the low side of the hole, the tool joints with this type hard banding that are located in the casing could create a problem by causing excess wear of the casing. Reed Tubular Products Company recognized the problem that the jagged edges of tungsten carbide particles can abrade casing and that preferably a smooth surface for minimum friction and minimum abrasion is desirable. They solved the problem by adding an alloy, which is more compatable with the casing, over conventional hard metal tungsten carbide banding. It is their position that the alloy covering wears down to form a dense and tough meld with the carbide particles, which results in a very hard but smooth surface that achieves the simultaneous objectives of protecting both the tool joint and the casing in which it is run.

It is an object of this invention to provide a wear strip of cast material that can be quickly and easily attached to the surface of a downhole tool subject to wear and that although very hard will wear smooth to thereby reduce to a minimum any abrading the wear strip may cause to well casing in which the tool is being rotated.

These and other objects, advantages, and features of this invention will be apparent to those skilled in the art from a consideration of this specification including the attached drawings and appended claims.

In the Drawings:

FIG. 1 is an isometric view of a box of a tool joint with the wear strips of this invention being placed on the box to be attached to the box in accordance with the method of this invention;

FIG. 2 is a side view of one of the wear strips shown in FIG. 1;

FIG. 3 is a plan view of the wear strip of FIG. 2;

FIG. 4 is an end view of the wear strip of FIG. 2;

FIG. 5 is a cross-sectional view through a tool joint with the wear strips in position prior to being secured to the tool joint by welding;

FIG. 9 is a side view of a stabilizer that has the wear strips of this invention attached to the outer surface of the stabilizer blades; and FIG. 10 is an end view of the stabilizer of FIG. 9.

The wear strips of this invention can be shaped to fit any surface on a downhole member or well tool that is subject to wear and they can be mounted on the surface using the method of this invention. In the description below, the wear strips and method will be described for attaching the wear strips to a tool joint and a stabilizer.

Drill pipe used in rotary drilling will have a female threaded connection at one end called a "box" and a male threaded connection at the other end called a "pin". The box and pin are short tubular sections that are machined separately and attached to the ends of the drill pipe by welding. These separately machined, threaded connections are called tool joints. They are larger in diameter than the body of the drill pipe. For example, in FIG. 1, if body 10 is 4½ inches in diameter, the outside diameter of tool joint 12 will be 5¾ to 6⅛ inches in diameter, depending upon the type of thread used. In FIG. 1, tool joint 12 is the box or female portion. Hard banding is located on the box, because the box is usually longer than the pin. This allows the hard banding to be placed on the box and still allow sufficient space above the hard banding for the box to be gripped by the tongs that make up and break out the threaded connections, when the pipe is run into and pulled out of the hole.

In accordance with this invention, the wear strips, which are curved at approximately the radius of curvature of the surface to be protected, are located in end-to-end, abutting, relationship along the surface to be protected. In the embodiment shown, three such wear strips, 14, 16, and 18 are curved along their longitudinal axis to form a band around the outside surface of box 12.

Figure 6:
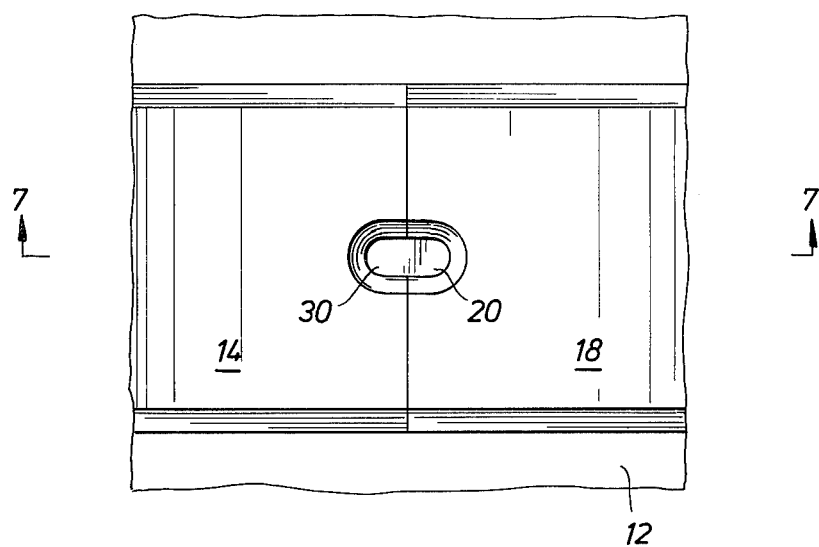
FIG. 6 is a view looking in the direction of arrows 6—6 of FIG. 5.
Figure 7:
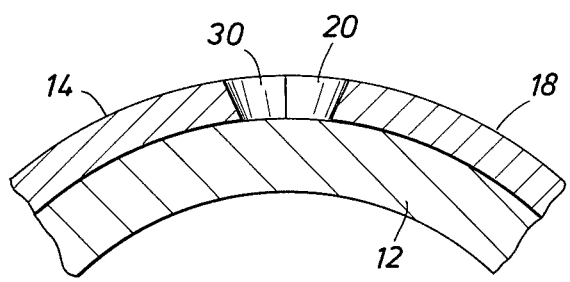
FIG. 7 is a sectional view taken along line 7—7 of FIG. 6.

In this embodiment, each wear strip is designed to cover ⅓ of the outer surface of the tool joint, and therefore extend over 120° of the surface. All of the wear strips are identical. Therefore, only one will be described in detail, which is wear strip 18 shown in FIGS. 2, 3, and 4. It is curved along approximately the same radius of curvature as the tool joint to which it is to be attached. Each side is beveled at about a 30° angle. Each end of the wear strip has a notch, centrally located, such as notches 20 and 22 on wear strip 18. Each notch is designed so that it will combine with the notch on the abutting wear strip to provide a space for confining weld metal that increase in cross-sectional area away from the surface to be protected by the wear strips. As best seen in FIGS. 5, 6, and 7, the notches expose a portion of the surface of the tool joint and the walls of the notches incline upwardly so that the area of the notches adjacent the outer surface of the wear strips is substantially larger than the area of the tool joint exposed by the notch.

Figure 8:
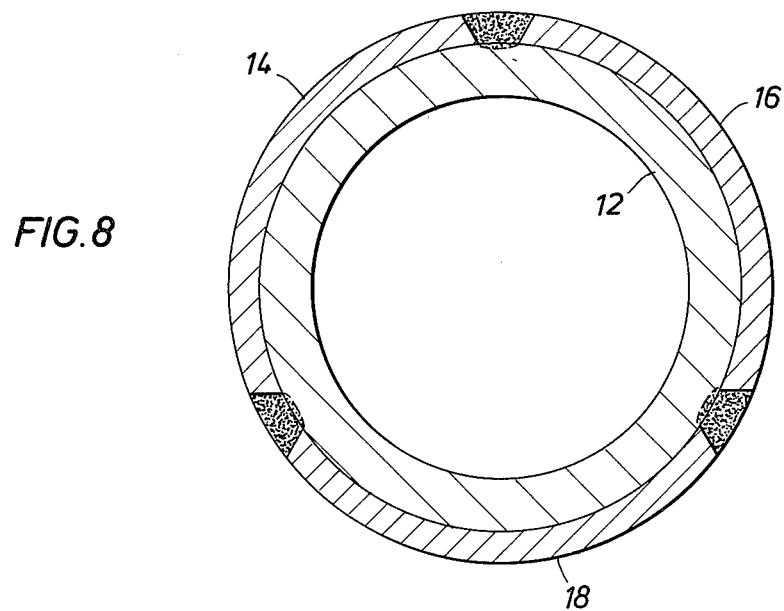
FIG. 8 is a view, similar to FIG. 5, after the wear strips have been secured to the tool joint in accordance with the method of this invention.

In accordance with the method of this invention, the wear strips are positioned on the tool joint, as shown in FIG. 5. They will be held in this position by a welding clamp (not shown). Weld metal is puddled in the openings provided by the notches in the ends of the wear strips to form plugs of weld metal, as shown in FIG. 8. The lower ends of the plugs are fused with the metal of the tool joint below the openings to lock the wear strips in position on the tool joint. The weld metal need not be fused to the wear strips.

Using this method to attach individual, separately cast, wear strips to the outside surface of the tool joint, reduces substantially any adverse effects on the temper of the metal of the tool joint, due to the heat of the welding electrode. In the embodiment shown, only three relatively small areas on the tool joint are subjected to the heat of the welding electrode and only long enough to obtain sufficient fusion between the weld metal and the tool joint to secure the plug of weld metal to hold the wear strips in position on the tool joint. This is not the strongest and surest way to attach wear strips to a tool joint. Therefore, the wear strip must be made of drillable material because they will be subjected to forces that may break the plugs of weld metal and cause the wear strips to drop down the hole. Should this happen, because they are made of cast, readily drillable material, the drill bit can break them up and flush the pieces out of the hole with the other cuttings carried by the drilling mud.

Preferably, the material from which the wear strips are cast should be one that becomes smooth with wear, but which remains hard and wear resistant. One such material for accomplishing this, is a cast iron containing 25-30% chromium and part vanadium.

Being cast material, the wear strips are subject to cracking due to thermal stress if they are over heated in one localized area. Therefore, after the weld is made to the tool joint in all three openings formed by the notches, the metal should be built up in the openings a little at a time, by moving the welding electrode back and forth among the openings. This is another advantage and feature of the method of attaching the wear strips described above in accordance with this invention, because it keeps to a minimum the amount of heat that must be dissipated through the wear strips themselves, and thus reduces substantially the danger of cracking the wear strips when welding them in place on the tool joint.

In FIGS. 9 and 10, the wear strips of this invention are adapted for mounting on the blades of a stabilizer. Here, wear strips 40 are curved along a transverse axis to match the curve of blades 42 of stabilizer 44. The strips are placed in end-to-end position along the blades and attached to the blade by plugs 46 of weld metal placed in the space formed by abutting notches in the ends of the strips, in the manner described above. The notches in the ends of the two outside strips are also filled with plugs 48 of weld metal.

For stabilizers with spiral blades, the wear strips will be curved to follow the spiral.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A method of encircling the outside surface of a tool joint with a band of wear resistant material comprising the steps of positioning end-to-end around the outside surface of a tool joint a plurality of strips of cast, relatively brittle, drillable material curved along their longitudinal axis with a radius of curvature approximately equal to the radius of curvature of the outside surface, clamping the strips in position on the tool joint, and puddling weld metal in first one opening and then another formed between the abutting ends of strips by notches in the ends of the strips that expose the surface of the tool joint for fusion with the weld metal and that have an increasing cross-sectional area away from the tool joint, puddling additional weld metal in said openings at brief intervals until a plug of weld metal has been formed that is fused to the surface to be protected but not to the strips to lock the strips on the tool joint while maintaining the temperature of the strips below that at which they will crack due to thrermal stress.

* * * * *